United States Patent
Haese et al.

(10) Patent No.: US 6,855,390 B1
(45) Date of Patent: Feb. 15, 2005

(54) OPTICAL DATA CARRIERS AND METHOD FOR PRODUCING THE SAME

(75) Inventors: Wilfried Haese, Odenthal (DE); Friedrich-Karl Bruder, Krefeld (DE); Thomas Bieringer, Odenthal (DE); Steffen Kühling, Meerbusch (DE); Franky Bruynseels, Sint-Gillis-Waas (BE); Dirk van Meirvenne, Chonburi (TH); René de Cleyn, Wuustwezel (BE)

(73) Assignees: Bayer Aktiengesellschaft, Leverkusen (DE); Bayer Antwerpen, N.V., Antwerp (BE)

( * ) Notice: Subject to any disclaimer, the term of this patent is extended or adjusted under 35 U.S.C. 154(b) by 0 days.

(21) Appl. No.: 10/111,991

(22) PCT Filed: Oct. 23, 2000

(86) PCT No.: PCT/EP00/10398

§ 371 (c)(1),
(2), (4) Date: Aug. 5, 2002

(87) PCT Pub. No.: WO01/32747

PCT Pub. Date: May 10, 2001

(30) Foreign Application Priority Data

Nov. 3, 1999 (DE) ......................................... 199 52 849

(51) Int. Cl.[7] ................................................ B32B 3/02
(52) U.S. Cl. ................ 428/64.1; 428/64.4; 430/270.11; 528/196

(58) Field of Search .............................. 428/64.1, 64.4, 428/411, 913; 430/270.11, 495.1, 945; 528/196; 210/644

(56) References Cited

U.S. PATENT DOCUMENTS

| | | | | |
|---|---|---|---|---|
| 5,412,060 A | * | 5/1995 | Wulff et al. ................ | 528/196 |
| 5,783,653 A | * | 7/1998 | Okamoto ................... | 528/196 |
| 6,183,830 B1 | * | 2/2001 | Okamoto et al. .......... | 428/64.7 |
| 6,384,185 B1 | * | 5/2002 | Inada et al. ................ | 528/491 |
| 6,646,098 B2 | * | 11/2003 | Dohi .......................... | 528/196 |

FOREIGN PATENT DOCUMENTS

| | | |
|---|---|---|
| EP | 0 380 002 | 8/1990 |
| EP | 0 264 885 | 1/2000 |
| JP | 7-196783 | 8/1995 |

* cited by examiner

*Primary Examiner*—Elizabeth Mulvaney
(74) *Attorney, Agent, or Firm*—Joseph C. Gil; Aron Preis

(57) ABSTRACT

A process for the preparation of optical data carriers made of a particualr polycarbonate is disclosed. The polycarbonate is prepared by the phase boundary process that entails reacting at least one dihydroxydiarylalkane in the form of its alkali metal salts with phosgene in the heterogeneous phase in the presence of sodium hydroxide solution and an organic solvent. The process is characterized in that the feedstock have but low content of Fe, Cr, Ni, Zn, Ca, Mg, Al metals or homologues thereof, and in that the organic solvent is separated off, and in that the polycarbonate which is obtained is worked up. The resulting polycarbonate is particularly useful in producing optical data carriers.

5 Claims, No Drawings

OPTICAL DATA CARRIERS AND METHOD FOR PRODUCING THE SAME

The invention relates to optical data carriers having particular stability when irradiated with blue laser light, and a process for the production thereof.

High purity polycarbonate is necessary for optical data carriers, because the polycarbonate is in the optical path of the laser beams, and the information structures stored in the polycarbonate are in the micron or submicron size range. Furthermore, the direction of development is towards even finer information structures and also the use of shorter wavelength lasers, for example lasers which emit blue light, which has a higher energy than the laser wavelengths which are normal currently. The object was therefore to develop data carriers and processes for the production thereof, which have particular stability when irradiated with blue laser light.

Polycarbonate is prepared by the so-called phase boundary process, in which dihydroxydiarylalkanes in the form of their alkali metal salts are reacted with phosgene in the heterogeneous phase in the presence of inorganic bases such as sodium hydroxide solution and an organic solvent in which the product polycarbonate is readily soluble. During the reaction the aqueous phase is dispersed in the organic phase, and after the reaction the organic polycarbonate-containing phase is washed with an aqueous liquid, during which, inter alia, electrolytes are to be removed and the wash liquid is then separated off.

In order to wash the solution which contains the polycarbonate EP-A-264 885 proposes stirring the aqueous wash liquid with the polycarbonate solution and separating out the aqueous phase by centrifuging.

Japanese Patent Application JP-A-07 19 67 83 describes a process for the preparation of polycarbonate, in which in order to achieve favourable colour properties the iron content of the sodium hydroxide solution which is used should be less than 2 ppm.

The object of the present invention is to provide an alternative and improved process for the production of pure polycarbonate substrates as well as to provide optical data carriers which have a particular stability when irradiated with blue laser light.

It has surprisingly now been found that such stable data carriers can be obtained from polycarbonate substrates which are prepared by a specific process.

The present application therefore provides a process for the preparation of polycarbonate by the phase boundary process, wherein dihydroxydiarylalkanes in the form of their alkali metal salts are reacted with phosgene in the heterogeneous phase in the presence of sodium hydroxide solution and an organic solvent, characterised in that a) the feedstocks are low in Fe, Cr, Ni, Zn, Ca, Mg, Al metals or homologues thereof, b) the organic solvent is separated off, and c) the polycarbonate which is obtained is worked up.

In the context of the invention, low in the metals mentioned or chemical homologues thereof means that preferably no more than 2 ppm, more preferably no more than 1 ppm, particularly preferably no more than 0.5 ppm and most particularly preferably no more than 0.2 ppm total metal, in particular of the metals listed above and homologues thereof, is contained in the feedstocks. The alkali metals are excluded from these limit values.

The feedstock sodium hydroxide solution should preferably be low in the metals mentioned. In particular, in relation to a 100 wt. % NaOH content, the sodium hydroxide solution should in each case contain no more than 1 ppm, preferably no more than 0.5 ppm, more preferably no more than 0.3 ppm alkaline earth metal or homologues thereof. In particular the feedstock sodium hydroxide solution, in relation to a 100 wt. % NaOH content, should contain no more than 1 ppm, preferably no more than 0.5 ppm, more preferably no more than 0.1 ppm iron.

The sodium hydroxide solution is preferably used as a 20 to 55 wt. %, particularly preferably 30 to 50 wt. % solution in the process according to the invention.

Sodium hydroxide solution having the limit values indicated above is obtainable by the membrane process which is known from the literature.

In a preferred embodiment in addition to the sodium hydroxide solution, the feedstocks bisphenol, in particular bisphenol and water, most particularly preferably bisphenol, water and organic solvent, are low in metal, in particular low in Fe, Cr, Ni, Zn, Ca, Mg, Al.

Here, embodiments are also included in which sodium bisphenolate (solution) has been prepared previously from sodium hydroxide solution and bisphenol(s).

These low-metal feedstocks are obtained by a procedure in which in a preferred embodiment the solvent is distilled, the bisphenol is crystallised, preferably crystallised several times or distilled, and fully deionised water is used.

The fully deionised water is preferably desalinated, degassed and/or de-silicified. The electrical conductivity (sum parameter for ionogenic substances of the salts still present in trace quantities in the water), for example, serves as a quality criterion, with the deionised water being characterised in the process according to the invention by an electrical conductivity of 0.2 $\mu$S/cm (DIN 38404 C 8) and an $SiO_2$ concentration of 0.02 mg/kg (VGB 3.3.1.1) or in each case less.

In a further preferred embodiment, of the group of feedstocks at least the sodium hydroxide solution, preferably additionally also the bisphenol, particularly preferably the sodium hydroxide solution, the bisphenol and the water, most particularly preferably the sodium hydroxide, the bisphenol, the water and the organic solvent, are filtered at least once, preferably twice, most particularly preferably three times in stepwise manner, before the reaction commences.

The present invention further provides a process for the preparation of polycarbonate by the phase boundary process, wherein dihydroxydiarylalkanes in the form of their alkali metal salts are reacted with phosgene in the heterogeneous phase in the presence of sodium hydroxide solution and an organic solvent, characterised in that a) the feedstocks are low in Fe, Cr, Ni, Zn, Ca, Mg, Al metals or homologues thereof, d) the aqueous phase formed during the reaction is separated off, and the separated-out organic polycarbonate phase is washed with an aqueous liquid, and e) the washed organic polycarbonate phase separated off from the wash liquid is heated, optionally after a filtration, and is filtered hot at least once, b) the organic solvent is separated off, and c) the polycarbonate obtained is worked up.

In a preferred embodiment, in process step a) directly after the reaction the reaction mixture is filtered, and/or the organic polycarbonate phase obtained and separated off is filtered, and/or the organic polycarbonate phase separated off in process step b) is filtered.

At least two of these filtrations are preferably carried out, in particular all three filtrations, are carried out.

In a preferred embodiment, especially in the case of hot filtration, filtering takes place at least once, preferably twice, particularly preferably at least three times, in particular in stepwise manner. The stepwise filtration commences with coarser filters, changing then to finer filters. The filtration of the two-phase media in process step a) is preferably carried out with coarser filters.

In process step b) filters having a small pore size are used for the hot filtration. It is important for this purpose that the polycarbonate phase is present as a solution of the greatest possible homogeneity. This is achieved by heating the organic polycarbonate phase which generally still contains residues of aqueous wash liquid. Here, the wash liquid is dissolved, and a clear solution forms. The previously dissolved impurities, in particular the dissolved alkali metal salts, precipitate out and can be filtered off.

In order to obtain a homogeneous solution the known freezing-out process can also be used in addition to the process described above.

In order to carry out the filtration according to the invention, membrane filters and sintered metal filters or bag filters are used as the filters. The pore size of the filters is generally from 0.01 to 5 μm, preferably 0.02 to 1.5 μm, more preferably 0.05 μm to 1.0 μm. Such filters are obtainable commercially from the companies Pall GmbH, D-63363 Dreieich, and Krebsböge GmbH, D-42477 Radevormwald (SIKA-R CU1AS model), for example.

Significantly better filter service lives are obtained by combining the processes according to the invention.

The carrying-out of the other process steps is generally known. For instance, during the reaction the aqueous phase is emulsified in the organic phase. Droplets of varying size are then formed. After the reaction the organic polycarbonate-containing phase is usually washed several times with an aqueous liquid and is separated off as far as possible from the aqueous phase after each washing operation. The washing preferably takes place with very finely filtered low-metal water. The polymer solution is normally cloudy after washing and separation-out of the wash liquid. Aqueous liquid is used as the wash liquid, a dilute mineral acid such as HCl or $H_3PO_4$ is used to separate out the catalyst, and completely desalinated water is used for the further purification. The HCl or $H_3PO_4$ concentration in the wash liquid can be, for example, from 0.5 to 1.0 wt. %. The organic phase is, for example and preferably, washed five times.

Phase separation devices which can be used for separating off the wash liquid from the organic phase are the separation vessels, phase separators, centrifuges or coalescers which are known in principle, or also combinations of these devices.

To obtain the high purity polycarbonate, the solvent is evaporated off. Evaporation can take place in a plurality of evaporator stages. According to a further preferred embodiment of this invention, the solvent or some of the solvent can be removed by spray drying. The high purity polycarbonate is then obtained as a powder. The same applies to obtaining the high purity polycarbonate by precipitation from the organic solution followed by drying of the residue. For example, extrusion is a suitable means for evaporation of residual solvent. Strand evaporator technology represents an alternative technology.

Compounds which should preferably be used as feedstocks are bisphenols of the general formula HO—Z—OH, in which Z is a divalent organic radical having 6 to 30 carbon atoms, which contains one or more aromatic groups. Examples of such compounds are bisphenols belonging to the group comprising the dihydroxy diphenyls, bis(hydroxyphenyl) alkanes, indane bisphenols, bis(hydroxyphenyl) ethers, bis(hydroxyphenyl) sulfones, bis(hydroxyphenyl) ketones and α,α'-bis(hydroxyphenyl) diisopropyl benzenes.

Particularly preferred bisphenols belonging to the aforementioned groups of compounds are 2,2-bis(4-hydroxyphenyl) propane (BPA), tetraalkyl bisphenol A, 4,4-(meta-phenylenediisopropyl) diphenol (bisphenol M), 1,1-bis(4-hydroxyphenyl)-3,3,5-trimethyl cyclohexanone as well as optionally mixtures thereof. Particularly preferred copolycarbonates are those which are based on the monomers bisphenol A and 1,1-bis(4-hydroxyphenyl)-3,3,5-trimethyl cyclohexane. The bisphenol compounds to be used according to the invention are reacted with carbonic acid compounds, in particular phosgene.

The polyester carbonates are obtained by reacting the bisphenols which have already been named, at least one aromatic dicarboxylic acid and optionally carbonic acid.

Suitable aromatic dicarboxylic acids are, for example, orthophthalic acid, terephthalic acid, isophthalic acid, 3,3'- or 4,4'-diphenyl dicarboxylic acid and benzophenone dicarboxylic acids.

Inert organic solvents employed in the process are, for example, dichloromethane, the various dichloroethanes and chloropropane compounds, chlorobenzene and chlorotoluene, preferably dichloromethane and mixtures of dichloromethane and chlorobenzene are used.

The reaction can be accelerated by catalysts such as tertiary amines, N-alkylpiperidines or onium salts. Tributylamine, triethylamine and N-ethylpiperidine are preferably employed. A monofunctional phenol such as phenol, cumyl phenol, p.-tert.-butylphenol or 4-(1,1,3,3-tetramethylbutyl) phenol can be employed as a chain terminator and molecular weight regulator. Isatin discresol, for example, may be used as a branching agent.

In order to prepare the high purity polycarbonates the bisphenols are dissolved in an aqueous alkaline phase, preferably sodium hydroxide solution. The chain terminators optionally necessary for the preparation of copolycarbonates are dissolved in quantities of from 1.0 to 20.0 mol. % per mole bisphenol in the aqueous alkaline phase, or are added as such in an inert organic phase to the aqueous alkaline phase. Phosgene is then passed into the mixer containing the remaining reaction constituents, and the polymerisation is performed.

Chain terminators which are optionally to be used are both monophenols and monocarboxylic acids. Suitable monophenols are phenol itself, alkyl phenols such as cresols, p-tert.-butylphenol, p-cumylphenol, p-n-octylphenol, p-iso-octylphenol, p-n-nonylphenol and p-iso-nonylphenol, halophenols such as p-chlorophenol, 2,4-dichlorophenol, p-bromophenol and 2,4,6-tribromophenol, as well as mixtures thereof.

Suitable monocarboxylic acids are benzoic acid, alkylbenzoic acids and halobenzoic acids.

Preferred chain terminators are the phenols of the formula (I)

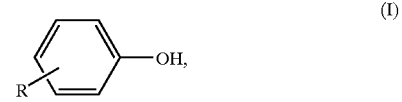

in which
R is hydrogen, tert.-butyl or a branched or unbranched $C_8$- and/or $C_9$-alkyl radical.

The preferred chain terminator is phenol and p-tert.butylphenol.

The quantity of chain terminator to be used is from 0.1 mol. % to 7 mol. %, in relation to moles of diphenols used in each case. The chain terminators can be added before, during or after phosgenation.

Branching agents can optionally also be added to the reaction. Preferred branching agents are the trifunctional or more than trifunctional compounds known in polycarbonate chemistry, in particular those having three or more phenolic OH groups.

By way of example and preferably, branching agents are also phloroglucinol, 4,6-dimethyl-2,4,6-tri-(4-hydroxyphenyl)hept-2-ene 4,6-dimethyl-2,4,6-tri-(4- hydroxyphenyl)heptane, 1,3,5-tri-(4-hydroxyphenyl) benzene, 1,1,1-tri-(4-hydroxyphenyl)ethane, tri-(4-hydroxyphenyl)phenylmethane, 2,2-bis[4,4-bis(4-hydroxyphenyl)cyclohexyl]propane, 2,4-bis(4-hydroxyphenyl isopropyl)phenol, 2,6-bis(2-hydroxy-5'-methylbenzyl)-4-methylphenol, 2-(4-hydroxyphenyl)-2-(2, 4-dihydroxyphenyl)propane, hexa-(4-(4-hydroxyphenyl isopropyl)phenyl) orthoterephthalic acid ester, tetra-(4-hydroxyphenyl)methane, tetra-(4-(4-hydroxyphenyl isopropyl)phenoxy)methane and 1,4-bis(4',4"-dihydroxytriphenyl)methyl)benzene as well as 2,4-dihydroxybenzoic acid, trimesic acid, cyanuric chloride and 3,3-bis(3-methyl-4-hydroxyphenyl)-2-oxo-2,3-dihydroindole.

The quantity of the branching agent which should optionally be used is from 0.05 mol. % to 2 mol. %, again in relation to moles of diphenols used in each case.

The branching agents may either be introduced in the aqueous alkaline phase with the diphenols and the chain terminators, or they may be added as a solution in an organic solvent before the phosgenation.

Some, up to 80 mol. %, preferably from 20 to 50 mol. % of the carbonate groups in the polycarbonates can be replaced by aromatic dicarboxylic acid ester groups.

The polycarbonates according to the invention are both homopolycarbonates and copolycarbonates and mixtures thereof. The polycarbonates according to the invention can be aromatic polyester carbonates or polycarbonates which are present in mixture with aromatic polyester carbonates. The term polycarbonate stands representatively for the polycarbonate substrates obtainable by the processes according to the invention.

The polycarbonates according to the invention have average molecular weights $M_w$ (determined by gel permeation chromatography following previous standardisation) of 10,000 to 30,000, preferably 12,000 to 25,000.

The present invention further provides polycarbonate substrates having high purity and the optical data carriers having particular stability when irradiated with blue laser light, which are producible therefrom.

Optical data carriers according to the invention which can be produced from the high purity polycarbonate according to the invention are in particular those which are read, are writable or are re-writable multiple times, with a laser beam being employed in the reading and writing opera tion. In particular those which use for writing and reading a laser beam within the wavelength range 390 to 650 nm, particularly preferably 400 to 450 nm. The optical data carriers here can have one information layer per disk, such as, for example, in the case of the CD audio, the DVD5 or when magneto-optically written, like the minidisk, two information layers such as in the case of the DVD9, the DVD 10 or more than two information layers, such as, for example, in the case of the DVD18. The optical data carriers are produced by known methods such as, for example, injection moulding or injection-compression moulding.

The optical data carriers produced from the polycarbonates prepared according to the invention have a particularly high stability when irradiated with blue laser light. They therefore have a longer life.

The following examples serve to explain the invention. The invention is not limited to the examples.

EXAMPLES

To prepare the polycarbonates, BPA (BPA is brought together continuously as a melt with sodium hydroxide solution) is mixed in sodium hydroxide solution with the exclusion of oxygen. The sodium hydroxide solution is used at different concentrations and purities (see Table 1), with the original sodium hydroxide solution being further diluted to a 6.5% sodium hydroxide solution with filtered deionised water in order to dissolve the bisphenols. This sodium bisphenolate solution is now filtered (0.6 $\mu$a filter) and introduced into the polycarbonate reaction. After the reaction the reaction solution is filtered through a 1.0 $\mu$nom bag filter and supplied for washing. Washing is carried out with 0.6% hydrochloric acid and it is then post washed a further 5 times with filtered fully deionised water. The organic solution is separated off from the aqueous solution and after the organic solution has been heated to 55° C. is filtered first with a 0.6 $\mu$a filter and then through a 0.2 $\mu$a filter. After isolation, the poly-2,2-bis(4-hydroxyphenyl)propane carbonate is obtained. The polycarbonate has an average molecular weight of $M_w=18000$.

TABLE 1

| Sodium hydroxide solution quality | | |
|---|---|---|
| | 1 | 2 |
| % NaOH | 50% | 32% |
| Fe (ppm) | 0.7 | 0.02 |
| Ca (ppm) | 2.0 | <0.1 |
| Mg (ppm) | 0.5 | <0.1 |
| Ni (ppm) | 0.2 | <0.01 |
| Cr (ppm) | 0.4 | <0.01 |
| Zn (ppm) | 0.1 | 0.06 |
| Total (ppm) | 3.9 | <0.3 |
| Conc. in 100% NaOH | 1 | 3 |
| Fe (ppm) | 1.4 | 0.06 |
| Ca (ppm) | 4.0 | <0.3 |
| Mg (ppm) | 1.0 | <0.3 |
| Ni (ppm) | 0.4 | <0.03 |
| Cr (ppm) | 0.8 | <0.03 |
| Zn (ppm) | 0.2 | 0.19 |
| Total (ppm) | 7.8 | <0.9 |

TABLE 2

| Filter service life | Sodium hydroxide from experiment | |
|---|---|---|
| | 1 | 2 |
| Before reaction 0.6 $\mu$a filter | 12 h | 30 d |
| After reaction 1.0 $\mu$a filter | 24 h | >60 d |
| End filter 1 = 0.6 $\mu$a filter | 12 h | 21 d |
| End filter 2 = 0.2 $\mu$a filter | | |

EXPERIMENTAL EXAMPLE

Optical data carriers in the format of a compact disk (12 cm in diameter, approx. 1.2 mm thick) are produced from the polycarbonates prepared in accordance with Experiment 1 and Experiment 2. No information structure is stamped on the disk, that is to say an unstructured matrix is employed so that no disruptive flexure effects occur during laser irradiation. Furthermore, the disks are not metallised and have no protective lacquer. The disks are produced on a CD injection moulding machine of the Netstal Discjet 600 type at cylinder temperatures of 315/340/350 and 350° C. (feed/compression/cylinder head/nozzle), a maximum injection velocity of 130 mm/sec and a mould temperature of 55° C. The cycle time here is 4.9 seconds.

The stability of the disks thus produced when irradiated with the blue laser is determined in the following experimental set-up. Laser light of wavelength 407 nm and a beam diameter of 1.35 mm from a krypton ion laser was focused onto the disk with the aid of a lens having a focal distance of 20 mm. The laser beam diameter in the focal point is 8.6 μm, which gives the power density I (GW/m$^2$) in the focus of the laser beam in Table 3. Behind the disk the intensity of the transmitted laser light is registered by a photodetector. In each case the times are determined by which a clear reduction in the intensity of the transmitted laser light is ascertained. The reduction in light intensity means here that damage processes are occurring in the polycarbonate. The experiments are carried out at different laser powers.

TABLE 3

| I [GW/m$^2$] | t [s] 1 | t [s] 2 |
|---|---|---|
| 0.2 | 123 | 232 |
| 0.4 | 13.3 | 35.3 |
| 0.7 | 6.8 | 14.3 |
| 0.9 | 4.4 | 8.8 |
| 1.3 | 2.4 | 4.6 |
| 1.7 | <0.2 | 2.4 |
| 2.6 | <0.2 | 1.5 |
| 3.5 | <0.05 | 1.2 |
| 4.3 | <0.05 | 0.8 |

The comparison of the times by which damage processes take place shows that the material according to the invention is more stable at low laser powers by a factor of approx. 2, and at high laser powers which are achieved in reality, stability is still markedly higher.

What is claimed is:

1. Polycarbonate characterized by its stability to blue laser light of more than 123 seconds when irradiated at 0.2 GW/m$^2$ prepared by the phase boundary process comprising
   (i) reacting at least one dihydroxydiarylalkane in the form of its alkali metal salt with phosgene in the heterogeneous phase in the presence of sodium hydroxide solution and an organic solvent wherein the concentration of Fe, Cr, Ni, Zn, Ca, Mg, Al metals or their homologues in the feedstock is no more than 2 ppm, to form an aqueous phase and an organic polycarbonate phase,
   (ii) separating the aqueous phase,
   (iii) washing the organic polycarbonate phase, optionally following filtration, with an aqueous wash liquid, to obtain a washed organic polycarbonate phase,
   (iv) separating the washed organic polycarbonate phase from the wash liquid, optionally followed by filtering, to obtain a separated washed organic polycarbonate phase,
   (v) heating the separated washed organic polycarbonate phase to obtain a heated phase,
   (vi) filtering the heated phase at least once, to obtain a filtered organic solvent and polycarbonate,
   (vii) separating the organic solvent, and
   (viii) working up the polycarbonate.

2. The polycarbonate of claim 1 wherein the concentration is no more than 1 ppm.

3. The polycarbonate of claim 1 wherein the concentration is no more than 0.5 ppm.

4. A molded article comprising the polycarbonate of claim 1.

5. An optical data carrier comprising the polycarbonate of claim 1.

* * * * *